United States Patent
Porcino et al.

(10) Patent No.: US 9,684,999 B1
(45) Date of Patent: Jun. 20, 2017

(54) EASILY COMPUTABLE OBJECT REPRESENTATIONS

(71) Applicant: Apple Inc., Cupertino, CA (US)

(72) Inventors: Domenico P. Porcino, Novato, CA (US); Jacques P. Gasselin de Richebourg, Sunnyvale, CA (US); Norman N. Wang, San Jose, CA (US); Timothy R. Oriol, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 14/713,876

(22) Filed: May 15, 2015

Related U.S. Application Data

(60) Provisional application No. 62/005,883, filed on May 30, 2014.

(51) Int. Cl.
*G06T 17/10* (2006.01)
*G06T 17/20* (2006.01)
*G06T 13/20* (2011.01)

(52) U.S. Cl.
CPC .............. *G06T 17/20* (2013.01); *G06T 13/20* (2013.01); *G06T 17/10* (2013.01); *G06T 2200/04* (2013.01)

(58) Field of Classification Search
None
See application file for complete search history.

(56) References Cited

U.S. PATENT DOCUMENTS

| 6,285,375 | B1 | 9/2001 | John, Jr. | |
| 7,898,540 | B2 | 3/2011 | Usami | |
| 2007/0036434 | A1 | 2/2007 | Saveliev | |
| 2008/0125224 | A1* | 5/2008 | Pollatsek | A63F 13/10 463/36 |
| 2012/0092369 | A1* | 4/2012 | Kim | G06T 19/006 345/633 |
| 2013/0106854 | A1 | 5/2013 | Fenney | |
| 2013/0329258 | A1* | 12/2013 | Pettis | F16M 13/022 358/1.15 |

OTHER PUBLICATIONS

Lien, Jyh-Ming. Approximate convex decomposition and its applications. Diss. Texas A&M University, 2006.*

Mamou, Khaled, and Faouzi Ghorbel. "A simple and efficient approach for 3D mesh approximate convex decomposition." 2009 16th IEEE International Conference on Image Processing (ICIP). IEEE, 2009.*

* cited by examiner

*Primary Examiner* — Daniel Hajnik
(74) *Attorney, Agent, or Firm* — Blank Rome LLP

(57) ABSTRACT

Techniques are disclosed for providing easily computable representations of dynamic objects so that a graphic systems' physics engine can more accurately and realistically determine the result of physical actions on, or with, such dynamic objects. More particularly, disclosed techniques generate a convex decomposition of an arbitrarily complex polygonal shape that is then simplified in a manner that preserves physically significant details, resulting in an object having a relatively small number of convex shapes that cover the original polygonal shape. The salience of a physically significant detail may be controlled via a threshold value which may be user or system specified.

20 Claims, 9 Drawing Sheets

RESULT = { }

RESULT = { SS2 }

RESULT = { SS1, SS2 }

RESULT = { }

RESULT = { }

RESULT = { SS1 }

SHAPE-3

SHAPE-3

RESULT = { }

SHAPE-3

ΔCDE IS BAD
RESULT = { }

SHAPE-3

ΔFAB IS BAD
RESULT = { }

SHAPE-3

RESULT = { }

RESULT = { SS1 }

RESULT = { SS1 }

RESULT = { SS1, SS2 }

RESULT = { SS1, SS2, SS3 }

EASILY COMPUTABLE OBJECT REPRESENTATIONS

BACKGROUND

Geometric computations are wide-spread and, in fact, essential in many real-world problems. One problem experienced by systems that represent objects as geometric shapes is that the objects may become so complex and the computational effort required to manipulate them so unmanageable (in terms of time and/or memory), that their use becomes intractable. One tactic to deal with this problem is to decompose objects into simpler components such as, for example, convex objects (convex objects are often preferred because many algorithms work more efficiently on convex objects). Convex decomposition (approximate and exact, may be used for a number of applications: collision detection (in two- or three-dimensional systems); mesh generation (for modeling physically based deformations); motion planning (e.g., to generate and control an object's motion through an environment); pattern recognition (for a physics-based approach to motion estimation); point location (determining if a point is inside or outside a polygon or polyhedra); shape representation (representing a complex shape by a collection of simpler convex shapes); and skeletonization (extracting features from images/polygons to represent the shape of objects, used for creating realistic character animations).

By way of example only, one use of convex decomposition operations is in the development of two-dimensional (2D) graphics for computer-based games. To assist game developers (and others who wish to use 2D graphics) software development kits (SDKs) have been modified over time to permit the use of 2D graphics engines to support full animation. Referring to FIG. 1, prior art 2D graphics system 100 operates on objects 105 from graphics frame 110. Initially, graphics engine 115 performs whatever operations on objects 105 the program developer has specified such as, for example, their rotation and/or translation. Physics engine 120 may be applied to one or more objects 105 to simulate, for example, friction, gravity, collisions between objects and fluid dynamics. (It will be recognized that in many graphics systems such as 2D graphics system 100, the objects operated on by physics engine 120 must be specifically designated.) Once both graphics engine 115 and physics engine 120 have executed, render engine 125 is applied to generate updated scene 130. Updated scene 130, in turn, may represent an animated sequence of graphics frames in accordance with output from physics engine 120.

One reason convex decompositions are not used more extensively is that they are often not practical for complex models. For example, an exact convex decomposition (ECD) can be costly to construct and result in a representation with an unmanageable number of elements. And, while a minimum set of convex components may be efficiently computed for simple polygons without holes, the problem is NP-hard for polygons with holes. An alternative to ECD is to partition or decompose a given shape into approximately convex pieces. For many applications, the approximately convex components produced by approximate convex decomposition (ACD) strategies provide similar benefits as ECD, while generated shapes are both significantly smaller and more efficiently computed.

SUMMARY

In one embodiment the disclosed techniques provide a method to select an appropriate decomposition strategy based on characteristics of the object being decomposed. If the approach selected is convex decomposition, a new algorithm in accordance with this disclosure is described to generate easily computable representations of arbitrarily complex objects or shapes so that, for example, a simulation engine can more accurately and realistically simulate the object's behavior (e.g., to simulate physics-based deformations and motion).

DETAILED DESCRIPTION

This disclosure pertains to systems, methods, and computer readable media to decompose arbitrarily complex shapes into two or more simple convex shapes. Such shapes may represent easily computable objects suitable for use by all manner of simulation engines (or simulators). In general, techniques are disclosed for determining which of multiple operations are best suited to decompose a given object based on various characteristics of the object. If the approach selected is convex decomposition, a new approach which may be either approximate (ACD) or exact (ECD) is disclosed. More particularly, it has been unexpectedly found that by taking into consideration just a few easily determined characteristics of an object, a near optimal selection of a decomposition strategy may be made. A novel approach to one of these strategies, convex decomposition, considers an object's number of reflex points and has been shown to be efficient in both the amount of time taken to decompose a given object or shape and the amount of memory needed to do so.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of graphics processing systems having the benefit of this disclosure.

Figure 1:
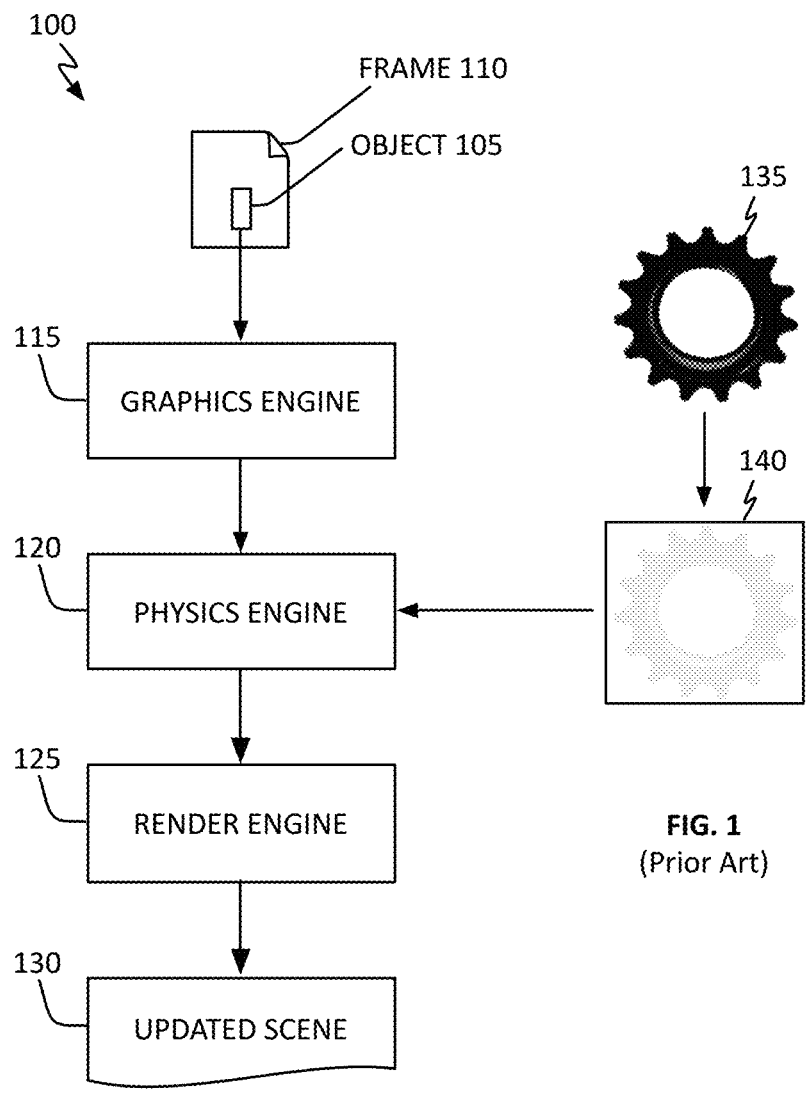
FIG. 1 shows, in block diagram form, a prior art two-dimensional (2D) graphics system.
Figure 2:
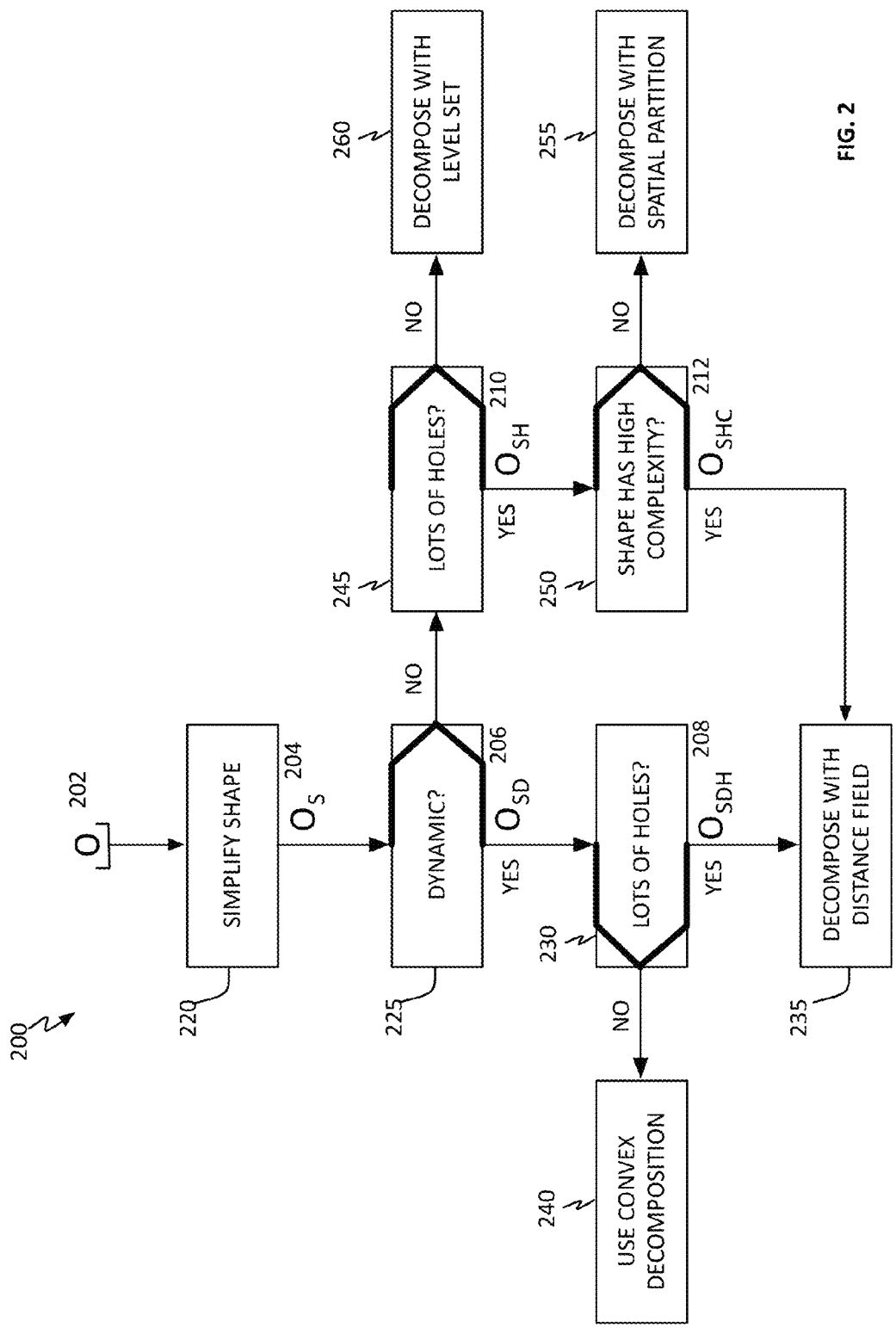
FIG. 2 shows, in flowchart form, decomposition selection operation in accordance with one embodiment.

Referring to FIG. 2, decomposition selection operation 200 in accordance with one embodiment begins by taking a given object O 202 and simplifying it to generate simplified-object $O_S$ 204 (block 220). (In another embodiment, object O 202 need not be simplified.) If simplified-object $O_S$ 204 is dynamic (the "YES" prong of block 225), a further test may be made to determine if simplified-dynamic-object $O_{SD}$ 206 has holes. As used herein, a "dynamic object" or "dynamic shape" refers to an object that is generated by an application in response to program input (such as, for example, from a user). That is to say, a dynamic object is an object whose shape is not known by an application a priori. If simplified-dynamic-object $O_{SD}$ 206 has lots of holes (the "YES" prong of block 230), simplified-dynamic-hole-object $O_{SDH}$ 208 may be decomposed in accordance with distance field decomposition methodologies 235. As used herein, an object has "lots of holes" if it has one or more holes where the retention of the hole is required for its dynamic characteristics to be manifest. For example, a block may have an interior hole, joined by a pipe to another interior hole. If a marble put into one hole would be expected to roll into the other hole via the pipe, it would be considered essential to retain a representation of the hole. If simplified-dynamic-object $O_{SD}$ 206 does not have lots of holes (the "NO" prong of block 230), it may be decomposed in accordance with convex decomposition methodologies (block 240). If simplified-object Os 204 is not dynamic, that is, static (the "NO" prong of block 225), another check may be made to determine if it has lots of holes (block 245). If simplified-object $O_S$ 204 has lots of holes (the "YES" prong of block 245), simplified-hole-object $O_{SH}$ 210 may be checked for complexity (block 250). As used in this context, an object is complex, if its density of details approaches its sampling resolution. For example, a banana has low complexity at a given resolution, meaning that any two samples of the banana's shape at adjacent pixel locations are likely to result in the same value. A cactus, on the other hand, would have high complexity at a given resolution because any two samples might be greatly different because they might hit either side of a needle on the cactus, or the surface of the cactus; any given sample point has a chance of having three different orientations. Another known approach applies a simplification algorithm (e.g., the Ramer-Douglas-Peucker algorithm; see discussion below). If the reduced or simplified shape is approximately the same as the unreduced shape, the object is not complex. One of ordinary skill in the art will understand that what constitutes "approximately the same" may be specific to the implementation, with the mathematical concept of "similar" well-known to those of ordinary skill in the art. If simplified-hole-object $O_{SH}$ 210 is complex (the "YES" prong of block 250), simplified-hole-complex-object $O_{SHC}$ 212 may be decomposed with difference field methodologies (block 235). If simplified-hole-object $O_{SH}$ 210 is not complex (the "NO" prong of block 250), it may be decomposed in accordance with spatial partition methodologies (block 255). Finally, if simplified-object Os 204 does not have lots of holes (the "NO" prong of block 245), it may be decomposed using level set methodologies (block 260).

Once object O 202 has been decomposed in accordance with one of blocks 235, 240, 255 and 260, the resulting shape may again be simplified (as in block 220). Alternatively, in post-decomposition simplification as part of, for example, block 240 the smoothness of the resulting shape may no longer be of paramount concern and so simplification may be applied aggressively.

Figure 3A:
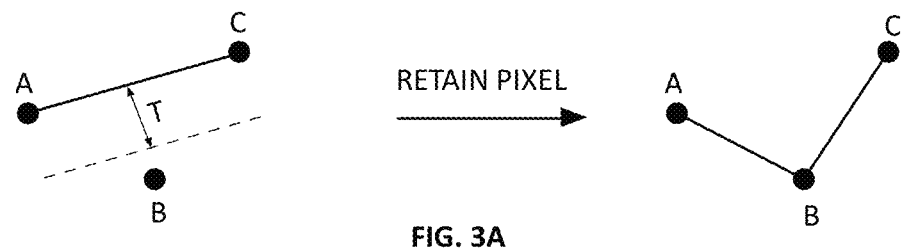
FIGS. 3A and 3B illustrate an object simplification process in accordance with the Ramer-Douglas-Peucker algorithm.
Figure 3B:
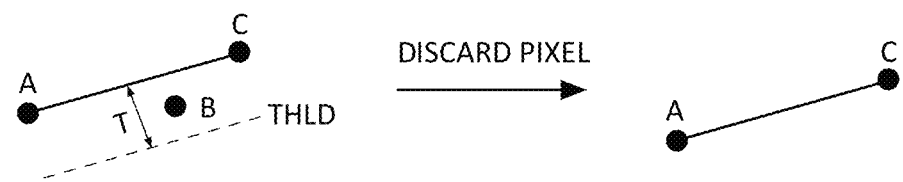

One suitable algorithm to simplify object O 202 (and possibly blocks 235, 240, 255 and 260) is the Ramer-Douglas-Peucker (RDP) algorithm. The RDP algorithm defines 'dissimilar' based on the maximum distance (specified, for example, by a threshold) between an original curve and a simplified version thereof, where the simplified curve consists of a subset of the points that defined the original curve. In one embodiment the threshold may be user specified (e.g., by the program developer). In another embodiment, the threshold may be automatically determined based on, for example, the ratio of an individual feature's size versus the overall size of the shape. In still another embodiment, the threshold may be a fixed value; either a specified number or a specified percentage of some characteristic of the curve comprising the outline (e.g., an angle threshold interpreted as a crease in the curve so that creases are preserved). The RDP algorithm simplifies a given curve or path by recursively removing those pixels that don't deviate by more than a specified (threshold or epsilon) amount from a line connecting two of it's neighbor pixels. Consider FIG. 3A, where pixel B deviates from line segment AC by more than a specified threshold T (left) and is, therefore, retained in the curve (right). In contrast, FIG. 3B shows that when pixel B deviates from line segment AC by less than the specified threshold T (left), it may be discarded (right). As shown here, the threshold may be related to the 'fidelity' one wishes to model the original object. If a very small threshold is specified, more of the pixels making up an object's outline will be retained. The larger a threshold, the more pixels from the object's outline will be eliminated or discarded.

In another embodiment, curve simplification operations in accordance with block 220 may include pre-processing the object's outline or contour to identify features that may be beneficial to preserve (e.g., sharp corners). During such an operation, the identified curve features could be weighted to discount their eligibility for elimination so as to reduce the likelihood that such features are "simplified out" or eliminated from the final outline. In one embodiment, edge segments identified as beneficial could be weighted according to the dot product of the second derivate of the curve with a vector perpendicular to the curve. Using this approach, a dot product approaching zero represents a kink in the curve and is more likely to be important and thus preserved, whereas a dot product of one indicates a smooth sample point, making it more eligible (i.e., more likely) for elimination as it does not necessarily contribute a salient feature. In one embodiment, this saliency measure may be combined with the RDP epsilon value (see discussion above). In embodiments such as this, a threshold value may be specified that determines what features are beneficial (e.g., "kinks") and which are non-beneficial (e.g., flat, or nearly flat, regions of the outline). Dot products greater than the specified threshold could be interpreted as indicating the feature is non-beneficial, while values less than, or equal to, the specified threshold may be interpreted as indicating the feature in beneficial.

By way of background, a distance field is a derived representation of a digital image, where each element in the field expresses that element's closest distance to the surface of an object represented as a polygonal object. (The convention is that positive values are outside the object while negative values are inside.) Distance fields, such as may be used in accordance with block 235, may be constructed using various distance metrics for example the Euclidean or Manhattan distance metrics. Distance fields are often used for collision detection in cloth animation, multi-body dynamics, deformable objects, mesh generation, motion planning, and sculpting. One of ordinary skill in the art will recognize that the implementation of distance fields applicable to a given situation may be informed by myriad details particular to the designer's environment.

The level set method (LSM) in accordance with block 260 is a numerical technique for tracking interfaces and shapes. The advantage of level set methods are that one can perform numerical computations involving curves and surfaces on a fixed Cartesian grid without having to parameterize the objects. Level set methods also make it relatively easy to follow shapes that change topology, for example when a shape splits in two, develops holes, or the reverse of these operations. These abilities make level sets an excellent tool to modeling time-varying objects, like inflation of an airbag, or a drop of oil floating in water. As with the use of distance fields, one of ordinary skill in the art will recognize that the implementation of a given level set method will depend upon the details of the designer's specific environment.

Spatial partitioning in general, and binary space partitioning (BSP) in particular, in accordance with block 255 is a generic process for recursively subdividing a space into convex sets by hyperplanes until the partitioning meets some specified requirement(s). This approach to subdividing a space gives rise to a representation of objects within the space by means of a tree data structure known as a BSP tree. The specific choice of partitioning plane and criterion for terminating the partitioning process varies depending on the purpose of the BSP tree. For example, in computer graphics rendering, the scene is often divided until each node in the BSP tree contains only polygons that can render in arbitrary order. BSP trees may be used in 3D video games where the static geometry of a scene is often used together with a Z-buffer, to correctly merge movable objects such as doors and characters onto the background scene.

A novel shape convex decomposition operation in accordance with one embodiment (e.g., block 240) may be expressed as pseudo-code as shown in Table 1. The algorithm outlined in Table 1 has been shown to be efficient in both the amount of time taken to decompose a given object or shape and the amount of memory needed to do so. The illustrated polygon decomposition pseudo-code begins by initializing a result list "Result" to an empty-list. Next, the shape to be decomposed may be preconditioned (see Tables 2 and 3) and, if successful, the shape's reflex points may be counted. As used here, a vertex of a simple polygon is reflex if it has an interior angle (i.e., if the interior angle at the vertex) is greater than Pi ($\pi$) radians. Any reflex count approach that meets the needs of the Developer may be used.

TABLE 1

Convex Decomposition Pseudo-Code

```
DecomposePolygon(shape)
{ // Start decompose polygon
      Result = empty list
      IF preconditionShape(shape) is FALSE, THEN QUIT
A     Count Reflex points
B     IF shape has no reflex points, THEN
      { // Start processing zero reflex point shape
         add shape to Result
         DONE
      } // End processing zero reflex point shape
      IF shape has more than 1 reflex point, THEN
      { // Start processing multiple reflex point shape
C        For each reflex point
         {// Start processing current reflex point
D           Starting at current reflex point, traverse shape CCW as far as
            can be gone while still creating a convex subshape and that
            does not incorporate the next reflex point
E           IF no valid convex subshape found using current reflex point,
            THEN
            { // Start no convex subshape found
               Get next reflex point
               GOTO C with shape
            } // End no convex subshape found
F           IF goodShape(subshape) THEN
            { // Start subshape removal
               Select best subshape
               Record subshape in Result
               Close gap resulting from removing subshape from shape
               Delete the points put into Result from shape
               Remember deleted points
               GOTO A with remaining subshape
            } // End subshape removal
         } // End processing current reflex point
G        IF all reflex points traversed and no convex subshape found,
         THEN
         { // Start CCW processing did not work
            Select a first reflex point
            Repeat multiple reflex shape processing moving CW (GOTO B)
         } // End CCW processing did not work
      }// End processing multiple reflex point shape
H     IF single reflex point, THEN
      { // Start processing single reflex point shape
         Starting at reflex point traverse shape CCW as far as can be
gone while still creating
         a legitimate convex subshape
J        IF goodShape(subshape) THEN
         { // Start subshape removal
            Record subshape in Result
            Close gap resulting from removing subshape from shape
            Delete the points put into Result from shape
            Remember deleted points
            GOTO A with remaining subshape
         } // End subshape removal
      { // End processing single reflex point shape
} // End decompose polygon
```

TABLE 2

Pre-Condition Shape Pseudo-Code

```
preconditionShape (shape)
{
   IF goodShape(shape), THEN
   { // Start shape is good case
      Simplify shape without creating edge intersections // optional
      IF shape has holes, THEN
      { //Start shape has holes case
         Use any appropriate algorithm to convert a polygon with holes to
            a polygon without holes
      } //End shape has holes case
      goodShape(shape) is TRUE
   } // End shape is good case
   ELSE
   { // Start shape is bad case
      goodShape(shape) is FALSE
```

TABLE 2-continued

Pre-Condition Shape Pseudo-Code

```
  } // End shape is bad case
}
```

TABLE 3

Good Shape Detection Pseudo-Code

```
goodShape (shape)
{
  IF shape has no reflex points AND triangles comprising shape do not
    cover an original point AND shape has no edge intersections, THEN
  {
    shape is GOOD
  }
  ELSE
  {
    shape is NOT GOOD
  }
}
```

A series of examples based on different shapes will now be described in terms of the pseudo-code presented in Tables 1-3. Referring first to Table 1, pseudo-code in accordance with one embodiment begins by initializing a result object (set, string, collection, . . . ) to empty. The shape to be decomposed may then be checked to determine if it meets certain pre-conditions. Referring to Table 2, precondition pseudo-code in accordance with one embodiment determines if the shape to be decomposed is a "good" convex shape and, if it is, returns a logical TRUE value and, if it is not, returns a logical FALSE value. Referring to Table 3, illustrative pseudo-code defines a shape as "good" if it has no reflex points, triangles representing the shape do not cover an original point of the shape, and the shape has no edge intersections. Those of ordinary skill in the art will recognize that this is not the only definition of what constitutes a good convex shape or object. The particular definition adopted for any given implementation may be a function of many factors peculiar to that implementation. Returning again to Table 1, if the precondition check returns FALSE the polygon decomposition operation may be terminated. If the precondition check returns TRUE, polygon decomposition operation continue to line 'A'.

Figure 4A:
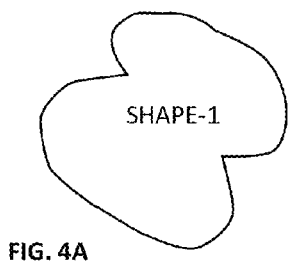
FIGS. 4A-4E illustrate the decomposition of a first shape in accordance with one embodiment.
Figure 4B:
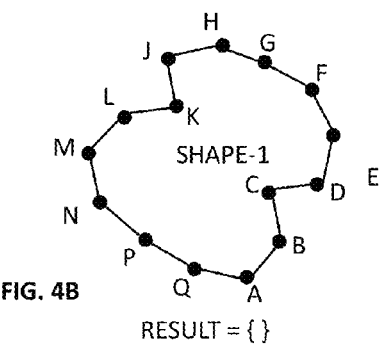
Figure 4C:
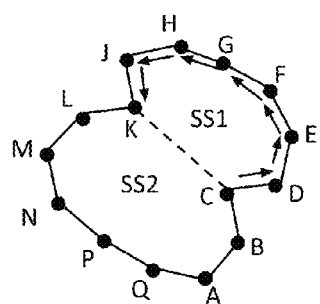
Figure 4D:
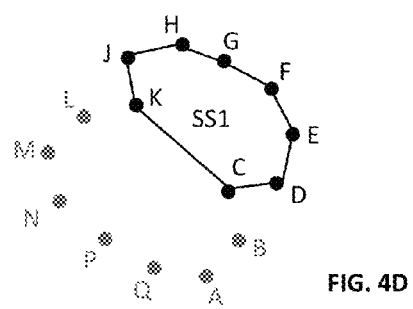
Figure 4E:
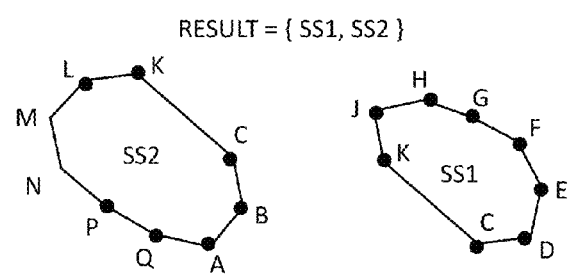

Referring now to FIG. 4, Shape-1 as shown in FIG. 4A may be determined to have 2 vertex points in accordance with line 'A' so that line 'B' operations are skipped. For pedagogical reasons, Shape-1's contour or outline may be labeled (starting at an arbitrary point) as shown in FIG. 4B. In the adopted representation, Shape-1's reflex points are C and K. Referring to FIG. 4C and line 'C' in Table 1, an arbitrary one of these vertices (e.g., vertex C) may be selected as a starting point and Shape-1 traversed in a counterclockwise (CCW) direction to vertex K (line 'D' in Table 1). (Note, had traversal not stopped at point K and continued to L (or beyond), the resulting subshape CDEF-GHJKL would not have been convex.) This walk shows Shape-1 may be partitioned into 2 subshapes by dotted line segment $\overline{CK}$: subshape-1 (SS1) and subshape-2 (SS2). Continuing at line 'F' in Table 1, because both SS1 and SS2 are good in the sense of Table 3, the "best" subshape may be selected. What defines "better" may vary depending on the implementation. In one embodiment, better may mean larger. In another embodiment, better may mean smaller. For purposes of the current example, better means "largest enclosed area." Referring to FIG. 4D, because SS2 has a larger enclosed area than SS1 it may be removed from Shape-1 and placed into the Result list. At the same time, SS1 may be closed by inserting line segment CK and those points associated with SS2 removed from further consideration, although their location is remembered. SS1 may then be passed to line 'A' in Table 1. Referring to line 'B' in table 1 and FIG. 4E, because SS1 has no further reflex points it may be added to the Result set, where after Shape-1 has been decomposed.

Figure 5A:
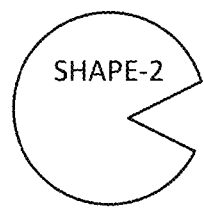
FIGS. 5A-5E illustrate the decomposition of a second shape in accordance with one embodiment.
Figure 5B:
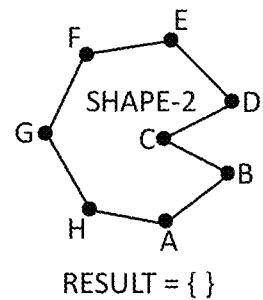
Figure 5C:
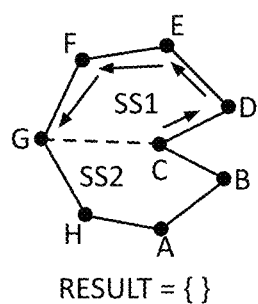
Figure 5D:
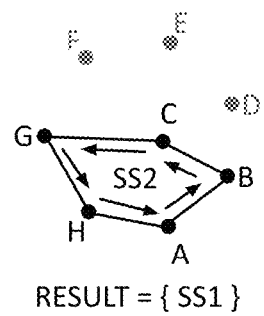
Figure 5E:
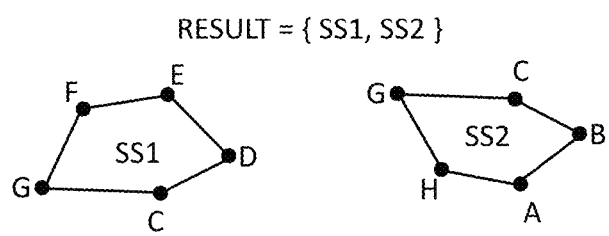

Referring now to Shape-2 in FIG. 5A, and after numbering each vertex as shown in FIG. 5B, Shape-2 may be determined to have a single reflex point in accordance with line 'A' in Table 1. Processing continues in accordance with Table 1 at line 'H'. Starting at the reflex point C in FIG. 5C, Shape-2 may be traversed CCW until reaching that vertex just keeps the shape created by a line segment from vertex C to itself convex. In FIG. 5C, that would be vertex G. (Note, that a line segment from vertex C to vertex H would create an interior angle at vertex C greater than π radians.) Line segment $\overline{CG}$ creates 2 subshapes SS1 and SS2, both of which are "good" in the sense of Table 3 (Table 1 at line T). Because both shapes are good, SS1 may be arbitrarily chosen to be removed and placed into the Result set as shown in FIG. 5D. The remaining subshape, SS2, may then be passed back to line 'A' in Table 1. Referring to FIG. 5E, because SS2 has no reflex points (Table 1 at line 'B') it too may be placed into the Result set after the polygon decomposition of Shape-2 is complete.

Figure 6A:
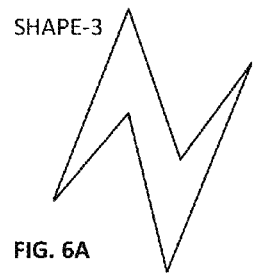
FIGS. 6A-6H and 6J illustrate the decomposition of a third shape in accordance with one embodiment.
Figure 6B:
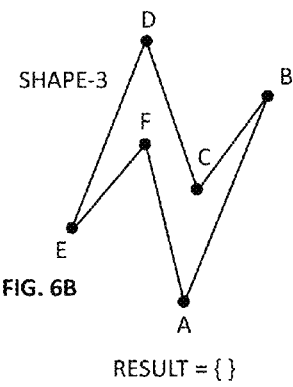
Figure 6C:
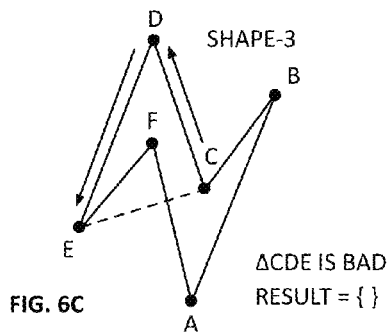
Figure 6D:
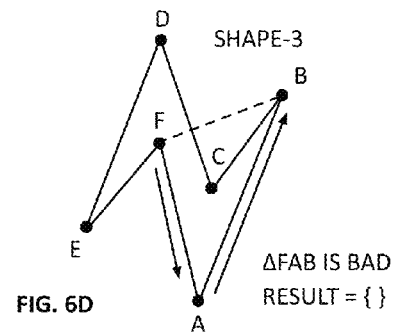
Figure 6E:
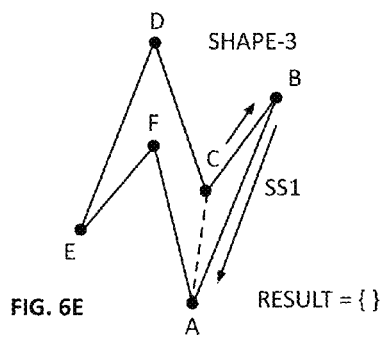
Figure 6F:
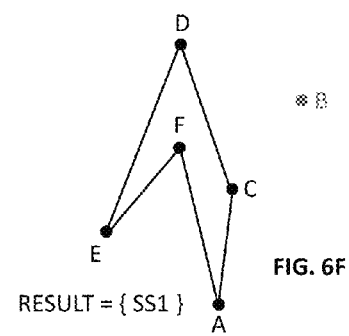
Figure 6G:
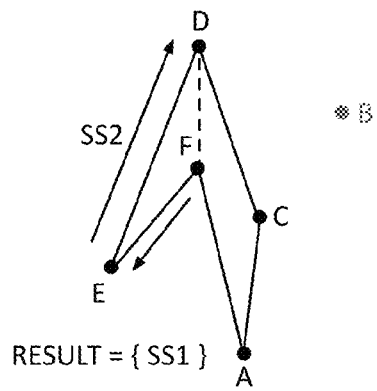
Figure 6H:
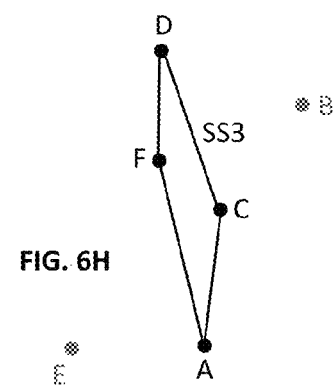
Figure 6J:
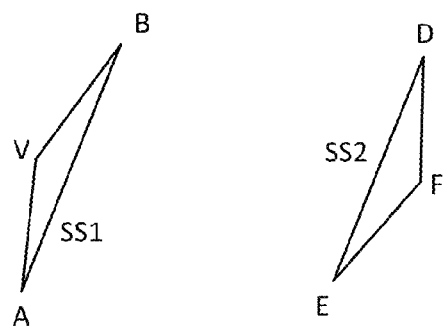
Figure 6J:
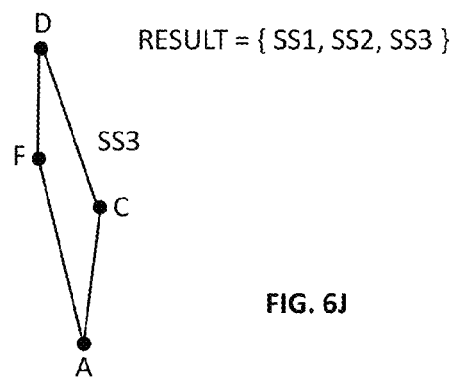

Referring now to FIG. 6, the polygonal decomposition of Shape-3 as shown in FIG. 6A (and vertex-numbered Shape-3 in accordance with FIG. 6B) can begin by determining the shape has 2 reflex points C and F (Table 1 at line 'A'). Referring to FIG. 6C and arbitrarily selecting the reflex point at vertex C as a starting point, Shape-3 may be traversed CCW to vertex E, resulting in triangle CDE (Table 1 at line 'D'). This triangle, however is not "good" in the sense of Table 3 because it "covers" another of the shape's vertices—vertex F (Table 1 at line 'E'). Referring to FIG. 6D, repeating this process beginning at vertex F results in another "bad" subshape, triangle FAB (Table 1 at lines 'E', 'C' and 'D'). Having found no "good" convex subshapes while traversing Shape-3 in the CCW direction, shape traversal operations may be repeated while moving in the clockwise (CW) direction (Table 1 at line 'G'). Referring to FIG. 6E, traversing Shape-3 in a CW direction starting at vertex C yields triangle CBA or convex SS1. (Note, continuing the CW traversal to vertex F yields non-convex subshape CBAF.) After removing SS1 from Shape-3 and placing it in the Result list (FIG. 6F), the remaining portion of Shape-3 may be traversed in the CW direction beginning at vertex F (FIG. 6G). Doing this identifies convex SS2 (triangle FED). Removing SS2 and placing it in the Result list yields polygon AFDC or SS3 (FIG. 6H). Because SS3 is itself convex, it may be placed directly into the Result list where after Shape-3 has been decomposed (FIG. 6J).

Figure 7:
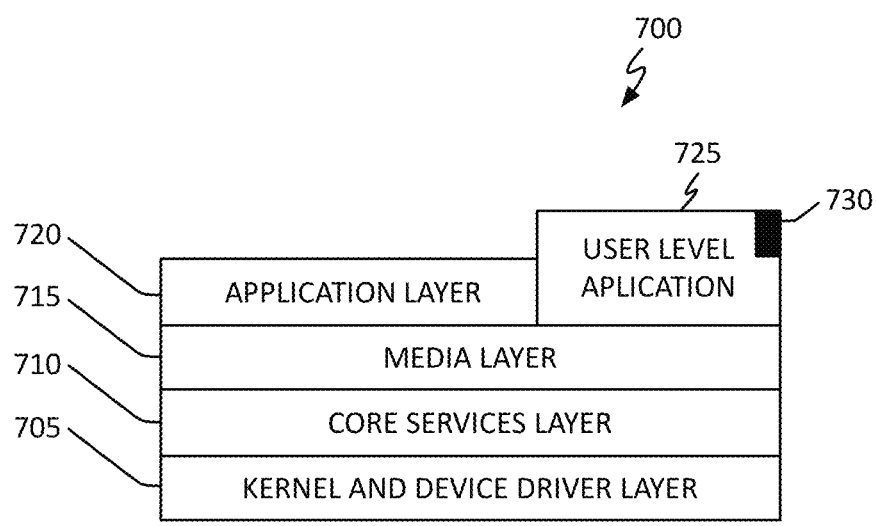
FIG. 7 illustrates a software environment in accordance with one embodiment.

As noted above, embodiments of the disclosed subject matter include software. As such, a general description of a common software architecture is provided in terms of the simplified layer-type diagram shown in FIG. 7. The notation employed here is generally intended to imply that software elements in one layer use resources from the layers below and provide services to layers above. In practice, however, all components of a particular software element in a particular layer may not behave entirely in that manner. Like hardware examples discussed below, software architecture or environment 700 is not intended to be exclusive in any way but rather illustrative. This is especially true for layer-type schemas such as that shown in FIG. 7, which software developers tend to express in myriad ways.

With those caveats regarding software in mind, software architecture 700 includes operating system (OS) kernel and device driver layer 705, core services layer 710, media layer 715 and application layer 720. OS kernel and device driver layer 705 can provide a kernel environment and support for file systems, networking, security, interprocess communication and device drivers (as an interface to hardware components, not shown). Core services layer 710 can provide low-level services related to hardware (e.g., graphics processing units and/or other special purpose hardware computational units) and networks. Media layer 715 can provide essential services to user-level applications (e.g., 725) but which have no direct bearing on the application's user interface (e.g., 730). Specifically, media layer 715 can provide the technologies to incorporate two-dimensional (2D) and three-dimensional (3D) graphics, animations, image effects, and audio and video functionality into user-level applications. Application layer 720 can include technologies for building a user-level application's user interface (e.g., 730), for responding to user events and for managing application behavior. In general, communication between elements in different layers (e.g., between user application 725 and graphics functionality in application layer 720) is governed by frameworks and application programming interfaces (APIs). For any given implementation, each of the illustrated layers may be a combination of two or more other layers. Some functionality described here may not be provided in all implementations. Further, while this disclosure may omit mentioning certain software and firmware, such omission has been made from illustrative environment 700, but not from intended embodiments.

By way of example, polygon decomposition in accordance with this disclosure may be used by user-level application 725 to generate the display of dynamic objects on user interface 730. To accomplish this, user application 725 may use API and frameworks to call into media layer 720. Media layer 720 may seek support from lower levels (e.g., core services layer 710) to provide the requested services. In one embodiment user application 725 resides on the same computer system that provides software environment 700. In another embodiment, user application 725 uses software environment 700 through a network connection. That is, user application 725 may be executing on one computer system and connected, through a network, to another computer system that provides software environment 700.

Figure 8:
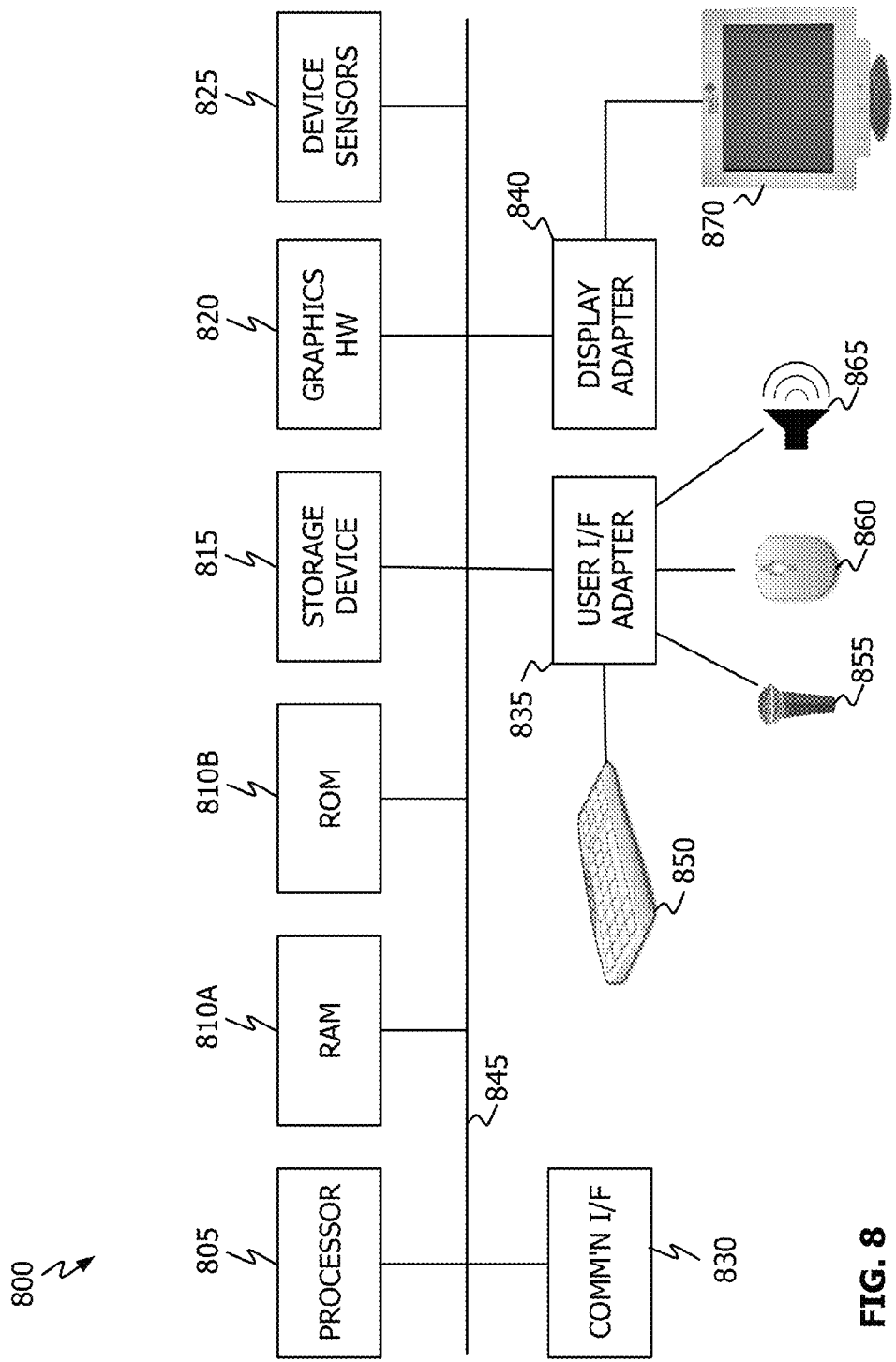
FIG. 8 shows, in block diagram form, a computer system in accordance with one embodiment.

Referring to FIG. 8, the disclosed embodiments may be performed by representative computer system 800 (e.g., a general purpose computer system or a dedicated image processing workstation). Computer system 800 may include one or more processors 805, memory 810 (810B and 810B), one or more storage devices 815, graphics hardware 820, device sensors 825 (e.g., proximity sensor/ambient light sensor, accelerometer and/or gyroscope), communication interface 830, user interface adapter 835 and display adapter 840—all of which may be coupled via system bus or backplane 845. Memory 810 may include one or more different types of media (typically solid-state) used by processor 805 and graphics hardware 820. For example, memory 810 may include memory cache, read-only memory (ROM), and/or random access memory (RAM). Storage 815 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 810 and storage 815 may be used to retain media (e.g., audio, image and video files), preference information, device profile information, computer program instructions organized into one or more modules and written in any desired computer programming language, and any other suitable data. When executed by processor 805 and/or graphics hardware 820 such computer program code may implement one or more of the methods described herein. Communication interface 830 may be used to connect computer system 800 to one or more networks (see discussion above). Illustrative networks include, but are not limited to: a local network such as a USB network; a business' local area network; or a wide area network such as the Internet and may use any suitable technology (e.g., wired or wireless). User interface adapter 835 may be used to connect keyboard 850, microphone 855, pointer device 860, speaker 865 and other user interface devices such as a touch-pad and/or a touch screen (not shown). Display adapter 840 may be used to connect one or more display units 870.

Processor 805 may execute instructions necessary to carry out or control the operation of many functions performed by device 800 (e.g., such as the generation and/or processing of images in accordance with Tables 1-3). Processor 805 may, for instance, drive display 810 and receive user input from user interface 815. User interface 815 can take a variety of forms, such as a button, keypad, dial, a click wheel, keyboard, display screen and/or a touch screen. User interface 815 could, for example, be the conduit through which a software developer creates a program using techniques described herein. Processor 805 may be a system-on-chip such as those found in mobile devices and include one or more dedicated graphics processing units (GPUs), having one or more processing cores. Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 perform computational tasks. In one embodiment, graphics hardware 820 may include one or more programmable graphics processing units (GPUs). In another embodiment, each of one or more GPU's have multiple cores.

Figure 9:
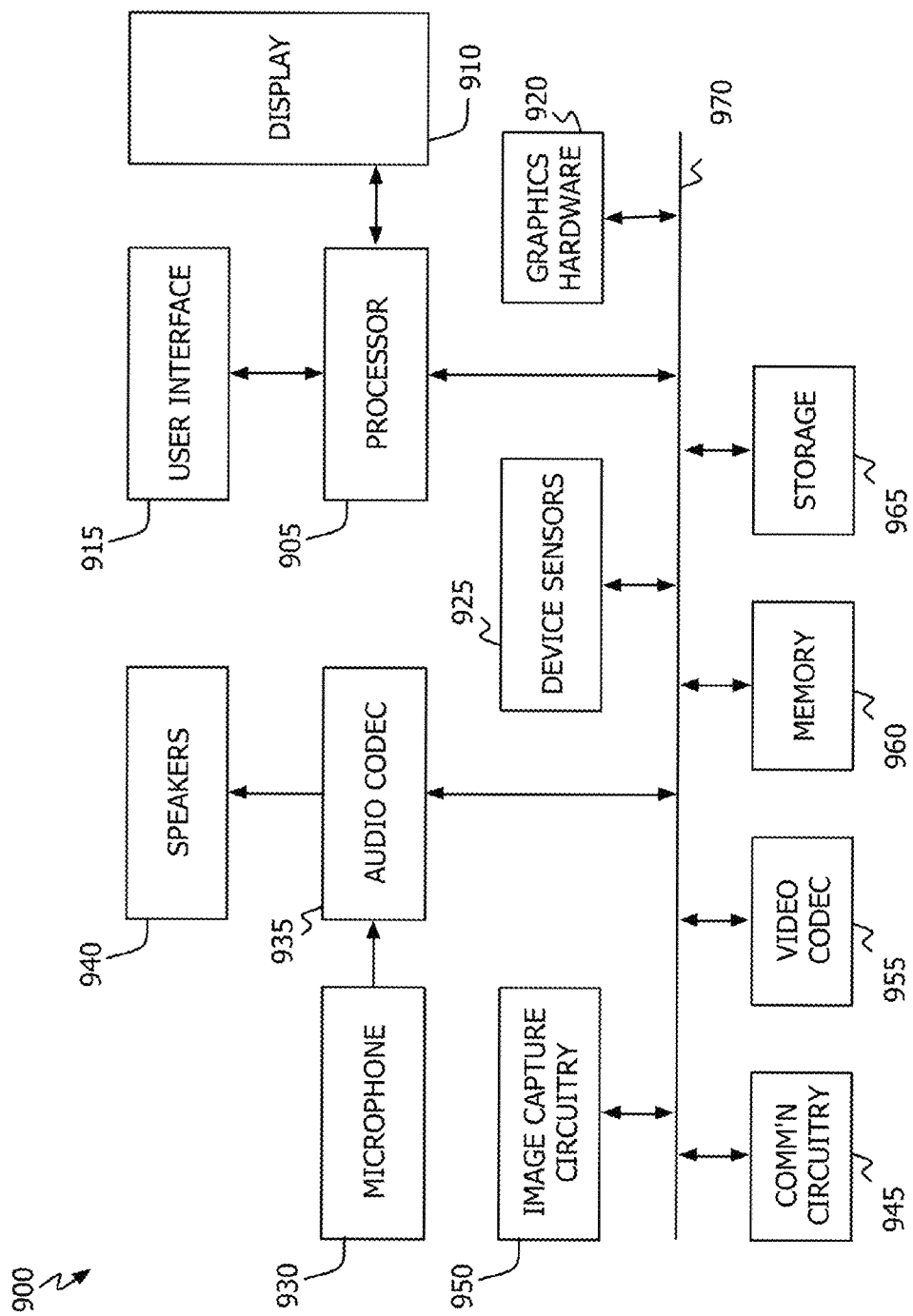
FIG. 9 shows, in block diagram form, a multi-function electronic device in accordance with one embodiment.

Referring to FIG. 9, a simplified functional block diagram of illustrative electronic device 900 is shown according to one embodiment. Electronic device 900 could be, for example, a mobile telephone, personal media device, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, image capture circuit or unit 950, video codec(s) 955, memory 960, storage 965, and communications bus 970. In one embodiment memory 960 and storage 965 may be as described above with respect to FIG. 8.

Processor 905 may execute instructions necessary to carry out or control the operation of device 900 as described above with respect to processor 805. Processor 905 may, for instance, drive display 910 and receive user input from user interface 915. User interface 915 can take a variety of forms, such as a button, keypad, dial, a click wheel, keyboard, display screen and/or a touch screen. Processor 905 may be, for example, any of the processor types identified above vis-à-vis processor 805. Graphics hardware 920 may be special purpose computational hardware for processing graphics and/or assisting processor 905 perform computational tasks. In one embodiment, graphics hardware 920 may include one or more programmable GPUs as discussed above with respect to graphics hardware 820. Processor 905 and/or graphics hardware 920 may execute a user application retained on storage 965 that, through API and framework calls invoke operations in accordance with this disclosure (e.g., decomposition selection operation 200 or polygon decomposition processes in accordance with Tables 1-3 operating in, or through, software architecture 700). The result of such operations my be the display of dynamic objects on display 910 as controlled by user input received via user interface 915.

It is to be understood that the above description is intended to be illustrative, and not restrictive. It will be recognized by one of ordinary skill in the art that the usefulness of representing objects as one or more simplified convex shapes is not limited to the generation and presentation of 2D shapes for a computer game. As a general approach to selecting which decomposition technique to apply to any given polygon or the decomposition of those polygons, the techniques and methods described herein are applicable to any situation in which convex polygons may be used. The foregoing material has been presented to enable any person skilled in the art to make and use the invention as claimed and is provided in the context of particular embodiments, variations of which will be readily apparent to those skilled in the art (e.g., some of the disclosed embodiments may be used in combination with each other). Further, FIGS. 1-9 do not exhaustively highlight the methods inherent in the pseudo-code provided in Tables 1-3. In one or more embodiments, one or more of the operations described here with respect to FIG. 2 and/or the steps described with respect to Tables 1-3 may be omitted, repeated, and/or performed in a different order. Accordingly, the specific arrangement of steps shown in these figures should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to simplify an object for manipulation and display, comprising:
   receiving a graphic object by one or more processors including a central processing unit (CPU) and a graphics processing unit (GPU);
   using the one or more processors to analyze one or more characteristics of the graphic object to make at least one of the following identifications—
      identifying whether the graphic object is dynamic, wherein a dynamic graphic object is a graphic object that is generated at the time of its display,
      identifying whether the graphic object has one or more operational holes, and
      identifying whether the graphic object is complex based on using a complexity determination algorithm;
   using the one or more processors to make at least all of the following decomposition determinations to select a determined decomposition methodology—
      determining to decompose the graphic object using a first decomposition methodology when the graphic object is not dynamic, has one or more operational holes and is not complex,
      determining to decompose the graphic object using a second decomposition methodology when the graphic object is not dynamic, has one or more operational holes and is complex,
      determining to decompose the graphic object using a third decomposition methodology when the graphic object is not dynamic and does not have one or more operational holes,
      determining to decompose the graphic object using a fourth decomposition methodology when the graphic object is dynamic and does not have one or more operational holes, and
      determining to decompose the graphic object using the second decomposition methodology when the graphic object is dynamic and has one or more operational holes;
   decomposing the graphic object using the one or more processors according to the determined decomposition methodology to create a decomposed model of the graphic object; and
   displaying the graphic object using the decomposed model through a graphical user interface.

2. The method of claim 1, wherein receiving a graphic object comprises:
   receiving an initial graphic object; and
   simplifying a border of the initial graphic object to generate the graphic object.

3. The method of claim 1, wherein decomposing the graphic object comprises:
   decomposing the graphic object using the one or more processors according to the determined decomposition methodology to create an initial decomposed model of the graphic object; and
   simplifying a border of the initial decomposed model to generate the decomposed model.

4. The method of claim 1, wherein decomposing the graphic object further comprises manipulating the decomposed model of the graphic object on a display.

5. The method of claim 1, wherein a dynamic object is an object that is generated by an application in response to program input.

6. The method of claim 1, wherein the first decomposition methodology comprises a spatial partition methodology, the second decomposition methodology comprises a distance field methodology, the third decomposition methodology comprises a level set decomposition methodology, and the fourth decomposition methodology comprises a convex decomposition methodology.

7. The method of claim L wherein each of the one or more operational holes comprises a hole that is required to be maintained for the dynamic characteristics of the graphic object to be manifest.

8. The method of claim 1, wherein identifying whether the graphic object is complex comprises:
   determining a density of detail in the graphic object;
   determining a resolution in the graphic object; and
   determining whether a ratio of the of the density and resolution is greater than a pre-determined threshold.

9. A computer system, comprising:
   a display device;
   a user input device;
   a plurality of processors operatively coupled to the display device and the user input device, wherein the plurality of processors includes at least one central processing unit (CPU) and at least one graphics processing unit (GPU); and memory operatively coupled to the plurality of processors and storing therein program instructions that when executed are configured to cause the plurality of processors to— receive a graphic object generated in response to input from the user input device;

analyze one or more characteristics of the graphic object to make at least one of the following identifications— identify whether the graphic object is dynamic, wherein a dynamic graphic object is a graphic object that is generated at the time of its display;

identify whether the graphic object has one or more operational holes; and identify whether the graphic object is complex based on using a complexity determination algorithm;

make at least all of the following decomposition determinations— determine to decompose the graphic object using a first decomposition methodology when the graphic object is not dynamic, has one or more operational holes and is not complex;

determine to decompose the graphic object using a second decomposition methodology when the graphic object is not dynamic, has one or more operational holes and is complex;

determine to decompose the graphic object using a third decomposition methodology when the graphic object is not dynamic and does not have one or more operational holes;

determine to decompose the graphic object using a fourth decomposition methodology when the graphic object is dynamic and does not have one or more operational holes; and determine to decompose the graphic object using the second decomposition methodology when the graphic object is dynamic and has one or more operational holes;

decompose the graphic object using the one or more processors according to the determined decomposition methodology to create a decomposed model of the graphic object; and display the graphic object through a graphical user interface on the display device.

10. The computer system of claim 9, wherein the program instructions to receive a graphic object comprise program instructions to:

receive an initial graphic object; and simplify a border of the initial graphic object to generate the graphic object.

11. The computer system of claim 9, wherein the program instructions to decompose the graphic object comprise program instructions to:

decompose the graphic object using the plurality of processors according to the determined decomposition method to create an initial decomposed model of the graphic object; and simplify a border of the initial decomposed model to generate the decomposed model.

12. The computer system of claim 9, wherein the program instructions to decompose the graphic object further comprise program instructions to manipulate the decomposed model of the graphic object on the display device.

13. The computer system of claim 9, wherein a dynamic object comprises an object that is generated by an application in response to program input.

14. The computer system of claim 9, wherein the first decomposition methodology comprises a spatial partition methodology, the second decomposition methodology comprises a distance field methodology, the third decomposition methodology comprises a level set decomposition methodology, and the fourth decomposition methodology comprises a convex decomposition methodology.

15. A non-transitory program storage device comprising instructions stored thereon to cause a plurality of processors to:

receive, by a plurality of processors at least one of which includes a central processing unit (CPU) and another of which includes a graphics processing unit (GPU), a graphic object;

analyze one or more characteristics of the graphic object to make at least one of the following identifications— identify whether the graphic object is dynamic, wherein a dynamic graphic object is a graphic object that is generated at the time of its display, identify whether the graphic object has one or more operational holes, and identify whether the graphic object is complex based on using a complexity determination algorithm;

make at least all of the following decomposition determinations— determine to decompose the graphic object using a first decomposition methodology when the graphic object is not dynamic, has one or more operational holes and is not complex, determine to decompose the graphic object using a second decomposition methodology when the graphic object is not dynamic, has one or more operational holes and is complex, determine to decompose the graphic object using a third decomposition methodology when the graphic object is not dynamic and does not have one or more operational holes, determine to decompose the graphic object using a fourth decomposition methodology when the graphic object is dynamic and does not have one or more operational holes, and determine to decompose the graphic object using the second decomposition methodology when the graphic object is dynamic and has one or more operational holes;

decompose the graphic object using the plurality of processors according to the determined decomposition methodology to create a decomposed model of the graphic object; and display the graphic object using the decomposed model through a graphical user interface.

16. The non-transitory program storage device of claim 15, wherein the instructions to receive a graphic object comprise instructions to:

receive an initial graphic object; and simplify a border of the initial graphic object to generate the graphic object.

17. The non-transitory program storage device of claim 15, wherein the instructions to decompose the graphic object comprise program instructions to:

decompose the graphic object using the plurality of processors according to the determined decomposition method to create an initial decomposed model of the graphic object; and simplify a border of the initial decomposed model to generate the decomposed model.

18. The non-transitory program storage device of claim 15, wherein the instructions to decompose the graphic object further comprise program instructions to manipulate the decomposed model of the graphic object through the user interface presented on a display device.

19. The non-transitory program storage device of claim 15, wherein a dynamic object comprises an object that is generated by an application in response to program input.

20. The non-transitory program storage device of claim 15, wherein the first decomposition methodology comprises a spatial partition methodology, the second decomposition methodology comprises a distance field methodology, the third decomposition methodology comprises a level set decomposition methodology, and the fourth decomposition methodology comprises a convex decomposition methodology.

* * * * *